Jan. 13, 1970  W. WHITTAKER  3,488,903
POSITIVE CLAMPING AND ANCHORING MEANS FOR
ELONGATED METAL MEMBERS
Filed May 20, 1968

INVENTOR
WILLIAM WHITTAKER
BY
Abraham C. Saffitz
ATTORNEY

United States Patent Office 3,488,903
Patented Jan. 13, 1970

3,488,903
POSITIVE CLAMPING AND ANCHORING MEANS FOR ELONGATED METAL MEMBERS
William Whittaker, Cross Gates, England, assignor to Cable Covers Limited, London, England, a British company
Filed May 20, 1968, Ser. No. 730,556
Int. Cl. E04c 5/12
U.S. Cl. 52—230                    4 Claims

ABSTRACT OF THE DISCLOSURE

A clamping and anchoring means for ends of metallic rods or cables to maintain the same in the set position regardless of the direction of the loading forces thereon. The anchor head comprises a body having a bore and a sleeve press fitted therein. The sleeve has a knurled outer surface and a threaded or serrated inner surface for the reception of the end of the rod or cable. The end of the element to be anchored is inserted in the sleeve, and the sleeve is forced into the bore whereby the knurled surface is interlocked with the walls of the bore and the serrated inner surface of the clamping sleeve bites into the element, whereby a rigid anchoring assembly is formed. The above anchor means are especially useful in anchoring the prestressing and reinforcing elements of concrete structures. The rods or cables are anchored by causing the anchor head bodies to abut the concrete structure, or by embedding the bodies in the concrete.

---

This invention relates to an anchor head for anchoring an end of a metallic rod, cable, strand, or similar element, so that the end is held firmly against dislodging forces in any direction.

More particularly, the invention relates to anchor heads to anchor the ends of rods or cables used as prestressing or reinforcing elements in concrete structures. These elements are under tensile forces and must be maintained under the desired tensile stresses at all times. Therefore, their ends must be held rigidly and permanently by the anchoring heads in the stressed positions with no give or yielding in the direction opposite to that exerted by the tensile forces.

The present art utilizes anchor heads which do not positively and rigidly hold the ends of the rods or cables in the clamped original position. Thus, in one common form of anchor head, the end of the rod or cable is gripped by clamping means having a tapered or wedgelike surface slidable in a complementary tapered bore in the anchor body. The tensile force exerts a pulling force on the clamping means in the direction wherein the tapered surfaces cooperate to increase the clamping effect. However, a decrease in the tensile force or movement of the anchored rod or cable in the opposite direction moves the tapered clamping means within the bore in the release direction of the taper, whereby the gripping force on the rod or cable is decreased or entirely released. Such variable gripping effects permit the ends of the rod or cable elements to slip and the prestressed and reinforcing effects of the elements are lost or greatly diminished.

In another form of anchor head, an end of a reinforcing element is passed through a bore in the anchor head and the end is upset so as to abut the end of the body of the anchor head. This arrangement also permits the end of the element to move relative to the anchor head and change its original anchored position.

An object of this invention is to provide an anchor head which holds the end of the rod or cable in a positive and rigid manner whereby a decrease or reversal of the tensile forces acting on the rod or cable does not effect the position of the anchored end.

Another object is to provide an anchor head embodying a few simple elements which can be easily assembled in the field by utilizing a conventional small press, or similar means.

A further object is to provide an anchor head comprised of only two parts, namely the anchor head body having a bore and a clamping sleeve insert fitting the bore, the sleeve having deformations on its exterior and interior surfaces to grip and clamp the anchor body and the end of the element to be anchored, respectively.

A further object is to provide a clamping sleeve as described above with longitudinal slots to render it more flexible and thereby facilitate its insertion in the anchor body.

Further objects and advantages will be apparent from the following description and accompanying drawing, wherein.

The anchor head comprises a body 1 having a bore 2. While bore 2 may be a through bore, it is preferable that body 1 be provided with an abutting annular flange 3 concentric with the bore.

Figure 3:
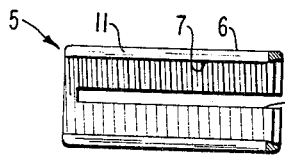
FIGURE 3 is a cross-sectional view of the gripping sleeve.
Figure 4:
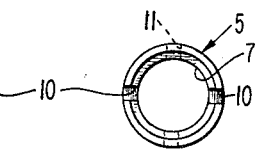
FIGURE 4 is an end view of the gripping sleeve.
Figure 5:
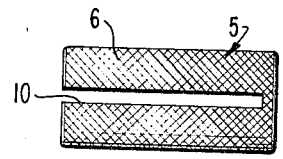
FIGURE 5 is a plan view of the gripping sleeve.

The clamping sleeve or insert 5, which is press fitted into bore 2 as described herebelow, is disclosed in FIGURES 3, 4 and 5. The sleeve is made of suitable steel and properly hardened. The external cylindrical surface 6 is diamond knurled, or otherwise roughened and deformed to provide a large number of projecting formations to engage and interlock with the interior surface of bore 2. The internal surface 7 of the sleeve is provided with a series of threads or serrated formations 8. These threads are intended to interlock with or bite into the ends of rods or cables to hold them positively and rigidly in the desired position. A preferable form of thread would be a non-reversible buttress type, since such threads have effective gripping and clamping action and resist axial forces acting in either direction. The selection of the shape and size of threads depends upon the size and the material of the elements to be anchored.

In order to increase the effectiveness of the gripping action and ease of assembly, longitudinal slots 10 and 11 are cut in the wall of sleeve 5. Slots 10, as shown in FIGURE 3, extend from an end of the sleeve and terminate a short distance from the other end. Slots 11, as shown in FIGURES 4 and 5, are located at 90° angles from the other end of the sleeve and terminate a short distance from the one end. While the above symmetrical slot formation is preferred, it is apparent that any formation may be utilized. It is also apparent that the slots may be omitted, for their presence is not necessary for the clamping function of the sleeve 5.

Figure 1:
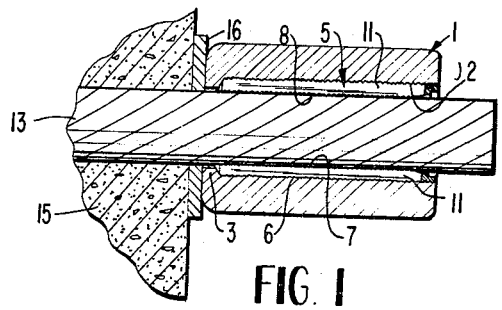
FIGURE 1 shows a cross-sectional view of the improved anchor head as applied to a prestressed and reinforcing element in a concrete structure.
Figure 2:
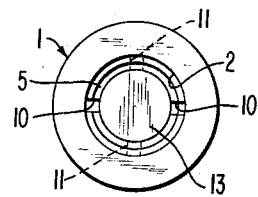
FIGURE 2 is an end view of the anchor head assembly.

FIGURE 1 discloses how the anchor head is assembled and utilized. Body 1 and clamping sleeve 5 are normally separate elements. To apply the anchor head to the end cable 13, the end is inserted into clamping sleeve 5. Thereafter, by means of a press or similar means, clamping sleeve 5 is forced into bore 2 of body 1, the parts assuming the positions shown in FIGURE 1. The forcing action causes the knurled surface 6 to bite into the cylindrical wall of cavity 2 and thereby interlock with it so as to withstand axial forces in both directions. The threaded means 8 bite into cable 13 and hold the cable in position against the axial forces acting in either direction. Thus, the anchor head and cable form a rigid structure with no chance of relative movement between them.

FIGURE 1 shows the anchor head utilized to anchor terminal end of a wire 13 at a wall 15 of a concrete structure. A metal wear ring 16 may be inserted between wall 15 and flange 3 of body 1. The other end of wire 13 is attached to a mechanism for applying a tensile force thereto to prestress the concrete with the anchor head reacting against the wall 15 and anchoring the wire thereto.

A similar anchor head structure may be also applied to the other end of wire 13 to be secured to the mechanism which applies the tensile prestressing force, and thus anchor the wire to an opposite point of the concrete structure.

Figure 6:
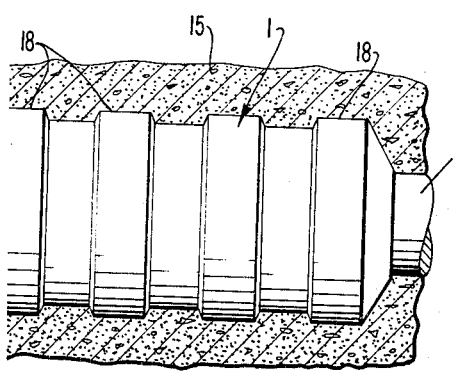
FIGURE 6 shows another embodiment of the anchor head which is suitable to be embedded in concrete or masonry.

FIGURE 6 shows another embodiment of the anchor head. Body 1 has external annular lands or flanges 18 formed thereon to be embedded in the concrete wall means 15. While annular lands are shown, various other types of formations may be used on the external surface of body to embed the anchor head. The rod 20 is anchored by means of a clamp sleeve 5, as in the embodiment of FIGURES 1–5.

Figure 8:
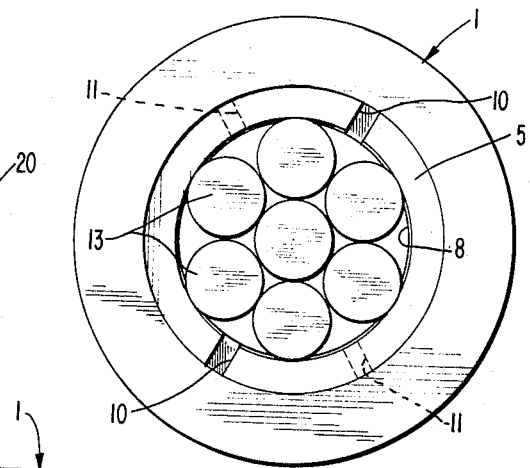
FIGURE 8 is an end view of FIGURE 7.
Figure 7:
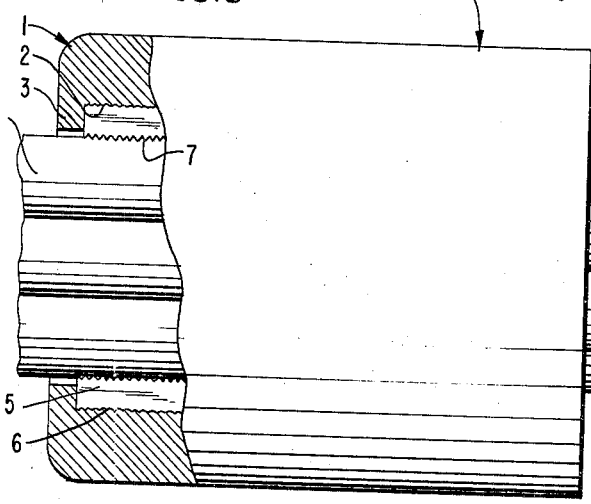
FIGURE 7 shows an anchor head similar to that shown in FIGURE 1, but used in conjunction with a multiple rope or strand cable.

FIGURES 7 and 8 show an anchor head of the type shown in FIGURES 1–5 utilized with a multiple rope or strand cable means. The structures are similar. The slot formations 10 and 11 are so arranged that they do not overlie a strand of the cable whereby all the strands adjacent clamping sleeve 5 are bitten into by the thread means.

While it is usual to apply the anchor head to the end of the reinforcing element, it is apparent that it may be applied to an intermediate portion of the rod to thereby anchor and hold the element securely at several points and not only at its end. It is also possible to arrange a series of anchor heads along the reinforcing element to cooperate with points on the concrete structure to anchor the element at such points.

Although certain preferred embodiments of the invention have been disclosed for purposes of illustration, it will be evident that various changes and modification may be made therein without departing from the scope and spirit of the invention.

What is claimed is:

1. An anchor head for clamping an elongated metallic rod or cable member and anchoring it in a set position comprising a body having a substantially cylindrical bore, a cylindrical sleeve insert having an outer diameter slightly larger than the inner diameter of said body bore which is adapted to receive said rod or cable member, said cylindrical sleeve having an inner cylindrical surface provided with non-reversible thread buttress formations including annular teeth-like means adapted to bite into the portion of the elongated rod or cable member extending through the clamping sleeve insert, knurled deformations on the outer surface of said insert forming projections to interengage upon forced insertion into and with the cylindrical inner wall of the body bore upon the uniform application of clamping pressure along the length of the assembled body, sleeve and rod or cable to thereby rigidly secure the clamping sleeve and rod or cable within the body, and means on an outer side of said body concentric with said body bore which is in abutting engagement with a relatively static structure to anchor said elongated rod or cable member against axial forces exerted thereon in either direction.

2. An anchor head as claimed in claim 1, wherein the means for abutting engagement with the static structure is a flange on the body concentric with the bore and is in abutting engagement with a surface of the structure.

3. An anchor head as claimed in claim 1, wherein the means for abutting engagement with the static structure is an annular land formation on the outside of the body which land formation is embedded in the static structure.

4. An anchor head as claimed in claim 1 wherein the said clamping sleeve insert has longitudinal slot means in its wall.

References Cited

UNITED STATES PATENTS

| | | | |
|---|---|---|---|
| 1,949,601 | 3/1934 | Burd | 24—126 X |
| 2,321,028 | 6/1943 | Johnson | 287—114 |
| 2,859,056 | 11/1958 | Marks | 287—114 X |
| 2,930,642 | 3/1960 | Howlett | 287—114 |
| 3,033,600 | 5/1962 | Drysdale | 287—114 |
| 3,137,971 | 6/1964 | Rhodes | 52—230 |
| 3,184,535 | 5/1965 | Worthington | 287—109 X |

ALFRED C. PERHAM, Primary Examiner

U.S. Cl. X.R.

24—126; 52—223; 287—109